United States Patent [19]

Anthony, Jr. et al.

[11] Patent Number: 4,707,803

[45] Date of Patent: Nov. 17, 1987

[54] EMULATOR FOR COMPUTER SYSTEM INPUT-OUTPUT ADAPTERS

[75] Inventors: Bruce O. Anthony, Jr.; Thomas M. Heise; Frank P. Sheppard, all of Rochester, Minn.

[73] Assignee: International Business Machines Corporation, Armonk, N.Y.

[21] Appl. No.: 745,728

[22] Filed: Jun. 17, 1985

[51] Int. Cl.[4] ...................... G06F 13/00; G06F 13/24
[52] U.S. Cl. ..................................................... 364/900
[58] Field of Search ... 364/200 MS File, 900 MS File

[56] References Cited

U.S. PATENT DOCUMENTS

| 4,042,914 | 8/1977 | Curley et al. | 364/200 |
|---|---|---|---|
| 4,245,300 | 1/1981 | Kaufman et al. | 364/200 |
| 4,493,028 | 1/1985 | Heath | 364/200 |
| 4,575,793 | 3/1986 | Morel et al. | 364/200 |
| 4,591,978 | 5/1986 | Peterson et al. | 364/200 |

*Primary Examiner*—Thomas M. Heckler
*Assistant Examiner*—Paul Kulik
*Attorney, Agent, or Firm*—Paul L. Sjoquist

[57] ABSTRACT

An optical fiber communications system includes an optical pathway defined as a closed optical loop with a signal source introducing a fixed frequency optical signal onto the loop as a reference signal for system wide propagation. Each terminal device in the system includes a thermally controllable bus tap resonator which can be controlled in a step-wise manner to support plural sets of resonant modes having corresponding different free spectral ranges with one mode of each supported set of resonant modes frequency locked to the system reference signal and another mode used for communications purposes. The bus tap resonators are thermally controlled to allow each terminal device to tune from a first set of resonant modes having a first free spectral range to another set of resonant modes having another free spectral range so that the frequency of the mode used for communications in the latter set will be different from that in the former set. The system reference signal source is preferably defined by a controllable resonant structure, such as a Fabry Perot cavity, which is controlled to lock to the frequency of a stabilized He-Ne laser. A laser diode operating in the desired wavelength band is controlled to lock the wavelength of its output to that of the one of the resonant modes of the stabilized Fabry Perot cavity to thus lock the frequency of the laser diode to that of the highly stable He-Ne laser.

11 Claims, 4 Drawing Figures

EMULATOR FOR COMPUTER SYSTEM INPUT-OUTPUT ADAPTERS

CROSS REFERENCE TO RELATED APPLICATIONS

This application is related to application Ser. No. 745,546 assigned to the assignee of the present application.

BACKGROUND OF THE INVENTION

This invention relates to computer systems, and more particularly to devices for interconnecting input-output (I/O) equipment to computer system processors. The invention also contemplates the interconnection of multiple processors, and the use of an emulated I/O adapter to economically expand the access to and use of computer processor I/O channels.

Conventional computer architecture utilizes one or several computer processors connected to internal memory devices and other logic, and has one or more I/O channels for transferring information, commands and controls to devices external the processor. A typical example of conventional architecture is a computer processor having a high-speed memory, and having an I/O channel which is connected to various hardware adapters to external memory sources, printers, communications lines, and other devices which are important to overall system operation but which are remotely located from the processor. Communications through the I/O channel are conducted according to a predetermined format of signal transmission, wherein the computer processor may selectively address and activate any of the devices wired to the channel. The devices are wired to respond to predetermined address information, and to interchange signals with the processor according to the predetermined format selected for the particular system.

Because of physical and electrical differences between the various devices on a processor I/O channel and the processor itself, it is usually necessary to interpose an adapter between the device and the channel electronics. An example of such an adapter is a disk controller, which is a specially designed package for interfacing with the electrical signals on the processor I/O channel on the one hand, and for interfacing with the magnetic media electrical circuit requirements of the disk on the other hand. A further example of an adapter is a communications adapter or modem, which accepts processor signals from an I/O channel and converts them to electrical signals suitable for transmission over telephone lines.

Particularly on more sophisticated computer systems, the I/O adapters required for handling various I/O devices are relatively complex and expensive to construct, for it is frequently required that they incorporate a predetermined minimum level of intelligence in the form of logic circuits within their design, so as to impose only a nominal loading effect upon the processor when they are activated. By contrast, I/O devices may be connected to smaller computers, such as computers which have become known as "personal computers", through adapters which are significantly less complex and sophisticated, for the loading penalty imposed upon the personal computer is relatively less expensive.

It is therefore desirable to provide an adapter of simple design and low cost which can enable the interconnection of smaller computers, such as personal computers, into the I/O channel control link to more sophisticated computers, and to thereby provide for the possibility of utilizing a personal computer as an element for subsequent control and connection to further I/O devices.

SUMMARY OF THE INVENTION

The invention includes an adapter, designated a "virtual channel", which is connected to an I/O channel of a computer processor, which emulates, through the cooperative interconnection of a personal computer, any of a plurality of I/O devices without requiring particular hardware adapters which are uniquely designed for each of the devices. The emulator includes a logic network which is defined as a "virtual channel", and which is connected to the processor I/O channel in a conventional manner, and which activates a personal computer for selectively controlling one or more I/O devices and for interacting with the host processor to manage the control of these I/O devices. The virtual channel is transparent to the host processor, which may be programmed to interact with conventional hardware adapters in a conventional manner, but the emulator intercepts processor commands and signals transmitted to a conventional adapter to selectively divert data interchange to an auxiliary computer (personal computer), which personal computer may itself be connected to a plurality of I/O devices. The system host processor may be programmed to interact with a conventional hardware adapter, but in fact may interact with other I/O devices controlled by the personal computer through the emulated functions provided by the virtual channel.

It is a principal object of the present invention to provide a virtual channel emulator for connection to a central processor channel, thereby to expand the communications capability between the central processor and a plurality of I/O devices.

It is a further object of the present invention to provide an emulator for flexible interconnection to a computer central processor without necessitating extensive software revisions within the computer central processor.

It is another object of the present invention to provide a virtual channel emulator to enable interconnection and shared operation between a computer system central processor and a smaller remote computer.

It is another object of the present invention to provide a device emulator which may be activated without a preformatted central processor control program, and wherein the emulation is accomplished through the assistance of a personal computer.

BRIEF DESCRIPTION OF THE DRAWINGS

The foregoing and other objects and advantages will become apparent from the following specification and claims, and with reference to the appended drawings, in which:

FIG. 3 shows a further diagram of a portion of the invention.

DESCRIPTION OF THE PREFERRED EMBODIMENT

Figure 1:
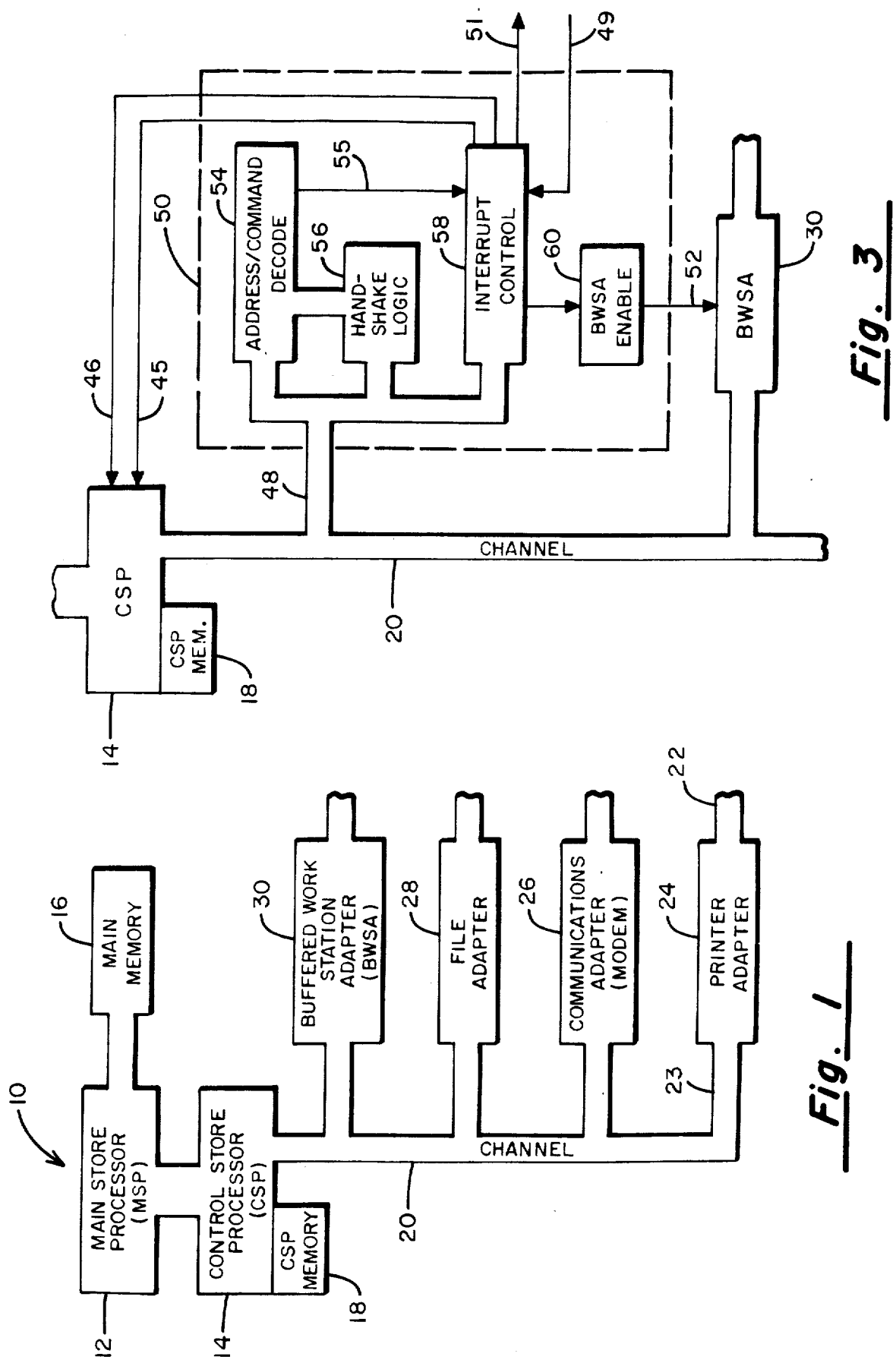
FIG. 1 shows one form of conventional architecture in a computer processor system.

Referring first to FIG. 1, there is shown one form of conventional architecture for a computer system. In the architecture form shown, the computer processor 10 is diagrammatically illustrated to exemplify the software architecture of the system. Computer processor 10 utilizes a main store processor (MSP) 12 which typically executes user applications programs and many of the storage management functions of the system. The MSP 12 has two primary interfaces, the main memory 16 and the control store processor (CSP) 14. The main memory 16 is typically a high-speed internal storage device which is utilized to retain the instruction code and data required for the user's applications, and also to retain information relating to the needs of the software operating system.

The control store processor (CSP) 14 is utilized to control the interaction of the application programs with the operating environment, including all of the devices which are connected to the systems input-output (I/O) channels. The CSP 14 typically incorporates a private storage area referred to as CSP memory 18, which may retain microcode for executing and controlling the transfer of data between the overall system and the I/O devices.

All of the data and command information which is interchanged between the central processor 10 and external devices is transferred over a channel 20. Equipment which is coupled for communication with central processor 10 is wired into channel 20 through appropriately designed adapters. For example, a printer may be coupled via a data bus 22 to a printer adapter 24. Printer adapter 24 is coupled through a further data bus 23 to channel 20. Printer adapter 24 receives command and data signals transmitted over channel 20, and is designed to recognize particular combinations of such signals as being indicative of a print operation, and is further designed to interpret portions of the information transfered over channel 20 as being indicative of information to be printed by the printer. Similarly, a communications adapter 26 is connected to channel 20, and is specifically designed to transform the signals from channel 20 into an electrical format suitable for transmission over telephone or other communications lines. Communications adapter 26 may be a device which is commonly referred to as a modem. Likewise, a file adapter 28 may be connected to channel 20 for interchanging information between processor 10 and one or more magnetic disk or other magnetic media storage devices. Similarly, a workstation adapter 30 may be coupled into channel 20 for interchanging information between processor 10 and one or more workstations. In this context, a workstation may be defined as a keyboard and display screen terminal for use by an operator. In some cases a workstation adapter 30 is connected to a plurality of individual workstations, and is identified as a buffered workstation adapter, in order to identify its additional function of accumulating sequences of information associated with particular workstations before communicating this information to the processor 10 via channel 20. An example of a buffered adapter of the type generally designed to serve the functions associated with adapter 30 may be found in U.S. patent application Ser. No. 494,250, filed May 13, 1983, and entitled "Data Processor Having Multiple-Buffer Adapter Between a System Channel and an Input-Output Bus".

Figure 2:
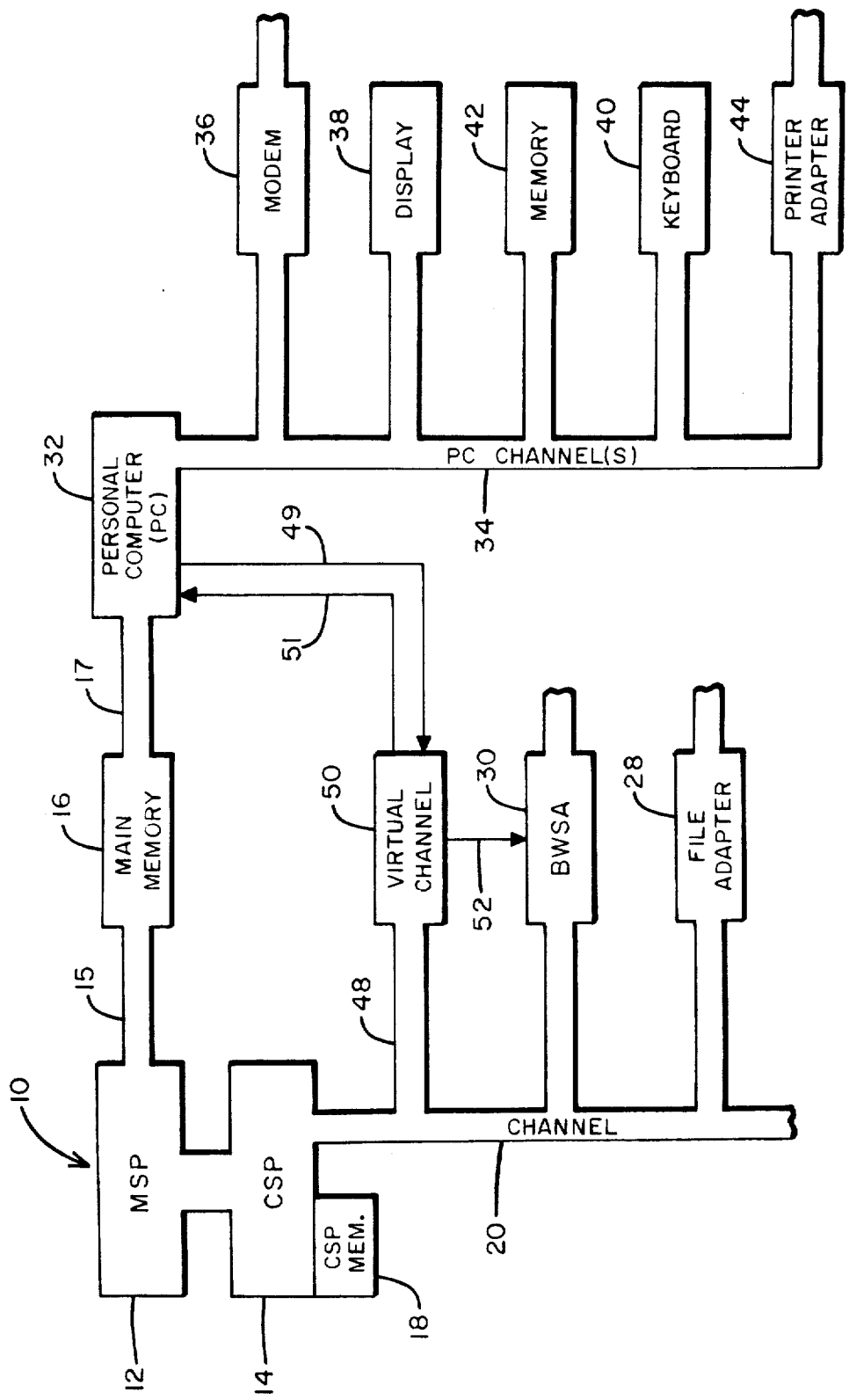
FIG. 2 shows a block diagram of one form of interconnecting the invention to a conventional computer processing system.

FIG. 2 illustrates the conventional computer system architecture of FIG. 1 as may be modified in association with the present invention. The central processor 10 is connected to a channel 20 and a main memory 16 in the conventional manner. However, in addition to a memory bus 15 for interconnecting main memory 16 to central processor 10, there is also shown a secondary memory bus 17. Secondary bus 17 connects an auxiliary computer 32, which may be of the size commonly referred to as a "personal computer" (PC), and provides a main memory access for the auxiliary computer processor 32. In addition, auxiliary processor 32 is connected to a PC channel 34, which itself provides access to a plurality of I/O devices into auxiliary processor 32. Among the I/O devices which may be connected into PC channel 34 are a modem 36 for telecommunications functions, a CRT display 38 and keyboard 40 for operator use, an expanded memory 42 for additional storage capability for processor 32, and a printer adapter 44 for connecting to an output printer. The operation of auxiliary processor 32 in conjunction with the invention will be described hereinafter.

The plurality of conventional adapters may be connected to channel 20, in the manner described hereinbefore. In addition thereto, a virtual channel 50 is connected into channel 20 to form a part of the invention. An interrupt signal line 51 is connected between virtual channel 50 and auxiliary processor 32. A signal return line 49 is connected between auxiliary processor 32 and virtual channel 50. A further control signal line 52 is connected between virtual channel 50 and buffered workstation adapter 30. Virtual channel 50 receives information in the form of commands and address data from channel 20 by way of a channel bus 48.

FIG. 3 shows a further functional block diagram of virtual channel 50. There are four main functional sections which comprise virtual channel 50. An address/command decode section 54 is connected via channel bus 48 to channel 20. This section contains logic decoding circuitry for monitoring the channel 20 signals as they occur, and determining whether the signals on channel 20 constitute a command which is to cause virtual channel 50 to emulate an I/O device. If the command decode logic circuitry determines that a command on channel 20 is to cause an emulation, it generates a signal to the handshake logic section 56 to respond to the command, and it also generates a signal on line 55 to the interrupt control logic section 58 to cause a further response to the command that has been issued and recognized. The handshake logic section 56 interacts with the channel 20 control logic in CSP 14 by generating a "service in" signal via channel bus 48 and channel 20. This is received by the CSP 14 in a conventional manner, to indicate to the CSP 14 that a device has been selected and that the device has acknowledged its readiness to proceed. The CSP 14 is unable to determine that the "device" which has acknowledged its command signal is virtual channel 50.

The interrupt control logic section 58 can generate interrupts to either the auxiliary processor 32 or to CSP 14, and it can generate two different interrupt priority levels to CSP 14. The highest priority level is used to force CSP 14, through execution of its interrupt program, to execute code to pass information to or from the auxiliary processor 32 to allow it to emulate the desired device. The lower priority interrupt level allows the CSP 14 to interrupt itself. The BWSA enable logic section 60 generates a signal over line 52 to gate the channel 20 "strobe" signals to the buffered workstation adapter 30. The "strobe" signal on channel 20 controls whether a device responds to channel 20 commands or ignores them. By selectively gating the "strobe" line the virtual channel 50 can send commands to the buffered workstation adapter 30 or, in the absence of gating a "strobe" signal, can cause the activation of an emulated adapter. With the exception of virtual channel 50, all of the architectural components illustrated on FIG. 3 are conventional in design.

The information transfer scheme which is utilized on channel 20 follows a predetermined format as to content and timing. The content and timing of this information is controlled by CSP 14, and is used in communicating with all devices connected to channel 20. Each information transfer cycle involves a three-step timing sequence which may be summarized as follows:

(1) Issue output command and signal "command out", followed by a "strobe" signal;

(2) Issue an address, followed by a "strobe" signal;

(3) Issue a data word, followed by a "strobe" signal.

The receiving device on channel 20 accepts the output command and the signal "command out" and issues a "service in" signal back to CSP 14, to indicate that the information transfer is proceeding. At the end of the information transfer cycle CSP 14 issues a "service out" signal, which then causes the receiving device to drop the "service in" signal, thereby terminating the information transfer sequence.

The operation of the apparatus illustrated in FIGS. 2 and 3, while appearing conventional to the CSP 14, nevertheless enables special emulating functions to be generated. In a typical case, CSP 14 issues a command over channel 20 to the buffered workstation adapter 30, requesting activation of the adapter for purposes of signal transmission. The address/command decode logic section 54 recognizes the command as a BWSA 30 I/O command and signals the handshake logic section 56 to respond to the command; while at the same time preventing BWSA 30 from responding to the command. Further, the address/command decode logic section 54 generates a signal over line 55 to cause the interrupt control logic section 58 to generate an interrupt over line 45 back to the CSP 14. The interrupt on line 45 causes CSP 14 to execute its interrupt software associated with that interrupt. The interrupt software in CSP 14 makes a determination whether the BWSA is to be activated, or whether an emulated device is to be activated. If the BWSA is to be activated the CSP 14 reissues the BWSA selection command, and the BWSA enable section 60 of virtual channel 50 issues a signal on line 52 to enable the BWSA to receive the command. Subsequent information transfer is then carried on between the CSP 14 and its memory, and either the BWSA 30 or any of the workstations coupled to its data bus.

In the event the interrupt software in CSP 14 determines that an emulated device is to be selected, it causes the CSP 14 to issue a new command with specified address information to cause the virtual channel 50, through its interrupt control section 58, to interrupt the auxiliary processor 32 via a signal generated on line 51. The interrupt software in CSP 14 has previously transferred the necessary emulation code and other related data to a predetermined location in main memory 16, which location is accessible by the auxiliary processor 32, and auxiliary processor 32 proceeds with the execution of the emulation code. Once the auxiliary processor 32 is interrupted the CSP 14 software code terminates, returning control to the other CSP 14 software tasks. Upon completion of the emulation the auxiliary processor raises IL1 to the CSP 14. The CSP 14 interrupt software performs appropriate post processing of the command from data interchanged in the shared main memory 16. This may include altering CSP 14 interrupt levels. Control is then returned to CSP 14 for continued execution. When auxiliary processor 32 has completed its execution of the emulation code it generates a return signal over line 49 to release the interrupt on line 51. Auxiliary processor 32, through its connection in the main memory 16, signals CSP 14 that the emulation has been completed, and CSP 14 resumes execution of software commands from the point of departure.

Figure 4:
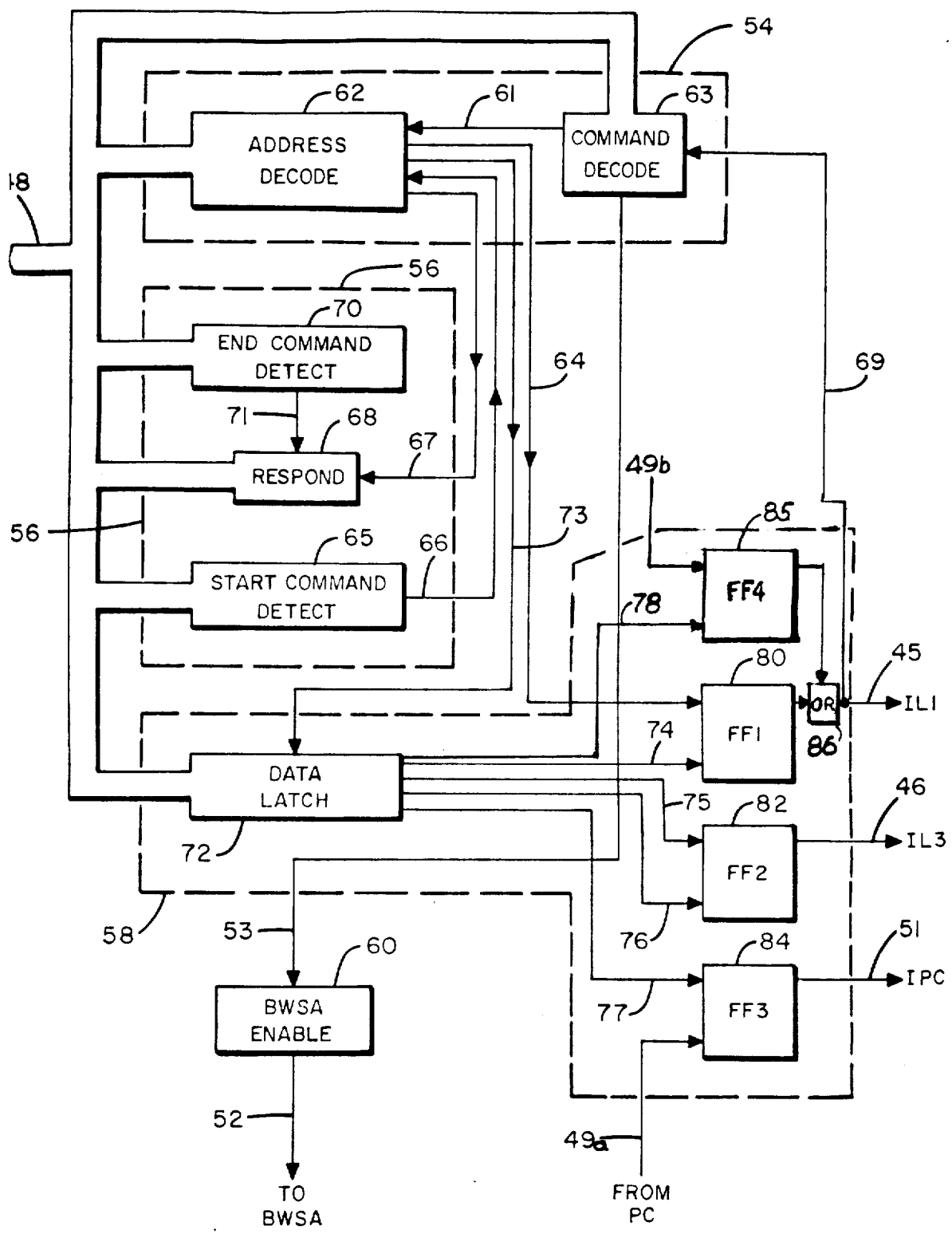
FIG. 4 shows a more detailed diagram of the apparatus shown in FIG. 3.

FIG. 4 illustrates a more detailed functional block diagram of virtual channel 50. All of the communication between the virtual channel 50 logic and CSP 14 occurs via channel bus 48. Information which is received on channel bus 48 may include commands, control sequences and data, as described hereinbefore. The address/command decode section 54 is capable of decoding either address information or command information. Address information is decoded in address decode logic 62, whereas command signals are decoded in command decode logic 63.

The handshake logic section 56 further comprises a start command detect logic network 65 which is connected into channel bus 48. Logic network 65 is wired to receive the "command out" signal originating in the CSP 14, which is indicative of an output command from the CSP 14 being available for decoding. As a result of detecting a "command out" signal, logic network 65 generates a signal on line 66 to the address decode logic network 62. The address decode logic network 62 in turn generates a signal over line 67 to the respond logic network 68. The respond logic network 68 generates a "service in" return signal to channel bus 48, which is ultimately received by CSP 14, and which notifies CSP 14 that a command signal has been received. The end command detect logic network 70 receives a "service out" signal which originates at CSP 14 and is transmitted over channel bus 48, and which is indicative of the end of a command sequence. As a result, logic network 70 generates a signal over line 71 to the respond logic network 68, which in turn drops the "service in" return signal to CSP 14 to notify CSP 14 that the "service out" signal has been received.

The interrupt control logic section 58 further comprises a data latch logic network 72, which is connected to channel bus 48 and which receives and holds data transmitted through channel bus 48. The data latch logic network 72 also receives an input from the address decode logic network 62, via line 73, which is indicative of the receipt of data. Data latch logic network 72 has five output lines, each of which are used to control the state of an interrupt flip-flop for controlling subsequent operations during an emulation routine. A signal on line 74 causes flip-flop 80, designated as FF1, to become reset. A signal on line 75 causes flip-flop 82, designated as FF2, to become set. A signal on line 76 causes flip-flop 82 to become reset. A signal on line 77 causes flip-flop 84, designated as FF3, to become set. The outputs of flip-flops 80 and 85 are OR'ed together in OR gate 86 to provide a signal via line 45 to CSP 14 which is an interrupt command; specifically, the signal on line 45 designates an interrupt priority level 1 to CSP 14, which is designated IL1. Line 69 also provides an indication of this condition to the command decode logic network 63. Flip-flop 80 is set by a signal over line 64 which is generated by the address decode logic network 62, as a result of decoding an address which selects the buffered workstation adapter 30 for activation. Flip-flop 82 is set to indicate a further interrupt condition to CSP 14, that condition being identified as "IL3", which is a higher priority level interrupt. Flip-flop 82 is controlled entirely by the information retained in data latch logic network 72. Flip-flop 84 becomes set upon receipt of the signal over line 77, and is indicative of an interrupt condition to the auxiliary processor 32. This interrupt signal is transmitted over line 51 to processor 32. A return signal from processor 32 is received by flip-flop 84 over line 49a, the return signal causing flip-flop 84 to become reset. Flip-flop 85 is set by an I/O address from auxiliary processor 32 on line 49b at the completion of emulation. Flip-flop 85 is reset by line 78 from data latch 72 at the end of emulation post processing by CSP 14.

The BWSA enable logic network 60 generates an enable signal over line 52 to enable the activation of the buffered workstation adapter 30. This signal receives its input over line 53 from the command decode logic network 63.

Virtual channel 50 is connected via channel bus 48 into channel 20, to monitor all signals transferred over channel 20. Virtual channel 50 is sensitive to channel 20 signals of two general types: channel 20 signals which are intended to activate the buffered workstation adapter 30 in a normal mode operating sense, and channel 20 signals which are interpreted to cause activation of an emulated device. When the CSP 14 generates a channel command to activate the buffered workstation adapter 30, this command is intercepted by the virtual channel 50, and is recognized as one of the commands which require service and response from the virtual channel 50. Specifically, address decode logic network 62 generates a signal over line 67 to cause the respond logic network 68 to initiate a signal back to CSP 14, indicating the command has been received. Secondly, the address decode logic network 62 generates a signal over line 64 to flip-flop 80, which causes an IL1 interrupt to be transmitted over line 45 back to the CSP 14. This interrupt forces CSP 14 into an interrupt software routine, and the software routine determines that the original command is one for activating the buffered workstation adapter 30, and it reissues a BWSA activation command. This new command is again received over channel bus 48 and is decoded by command decode logic network 63, resulting in a signal via line 53 to the BWSA enable logic network 60. The BWSA enable logic network 60 generates a signal on line 52 which passes to the buffered workstation adapter 30 to permit it to become activated in the normal operating mode. The buffered workstation adapter 30 will remain receptive to channel commands over channel 20 for so long as flip-flop 80 remains in the set condition. The flip-flop 80 will remain in this set condition until a command is issued over channel 20, and is recognized by virtual channel 50, corresponding to the need for activation of an emulated device.

When a signal is generated over channel 20 which the virtual channel 50 recognizes as an emulated device activation signal, the initial exchange of recognition signals between virtual channel 50 and CSP 14 is the same as has been hereinbefore described. However, the recognition by virtual channel 50 of the selection of an emulated device causes the data latch logic network 72 to activate lines 74 and 77. Line 74 causes flip-flop 80 to become reset, thereby removing the IL1 interrupt to the CSP 14. The signal on line 77 causes flip-flop 84 to become set, thereby generating an IPC interrupt to the auxiliary processor 32 over line 51. The IPC interrupt to the auxiliary processor 32, via line 51, causes the execution of an emulation routine which enables the auxiliary processor 32 to cooperate with central processor 10 through main memory 16, in the activation and handling of the emulated device. For example, if the emulated device is a device attached to the auxiliary processor 32, processor 32 can use its connection via memory bus 17 into main memory 16 to obtain the command and data information necessary to satisfy the emulated device request. This command and data information can be made available for memory access by auxiliary processor 32, as a result of instructions executed under the IL1 interrupt routine in CSP 14.

From the foregoing summary of operation of the invention, it is apparent that a number of advantageous operating conditions are possible. It is possible to add I/O devices to the auxilary processor 32, which is typically a small personal computer which is easy to program, and which interacts with I/O devices rather easily. The code necessary for providing the interaction of an I/O device with processor 32 may be independently and expeditiously developed, and the I/O device may be effectively added to the hardware equipment operable by the central processor 10 via the virtual channel 50. No hardware adapters need be added to channel 20 for this additional I/O device, because the adapter is emulated by the virtual channel 50 logic circuits. Therefore, no modification of internal code to central processor 10 need be made aside from the IL1 interrupt handling routine, which is a routine which may be independently modified and inserted into the central processor main memory 16. At the same time, normal communications capability continues to exist between the central processor 10 and the BWSA 30 because virtual channel 50 is adapted to permit normal communications when such are required.

The use of virtual channel 50 in the arrangement described herein effectively permits a small personal computer to be utilized as a programmable adapter for allowing any number of I/O devices to be added to a computer system, without need for the simultaneous addition of expensive further hardware adapters and extensive software code revisions in the main computer system memory. This has a degree of flexibility and cost advantage which is otherwise unattainable, particularly in large and relatively expensive computer processor systems. Further, the invention expands the capability of a large computer processing system to interact with other computer networks, particularly computer networks of small personal computers.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus for emulating an input-output adapter, for connection to an interruptable computer processor, and computer processor input-output channel, in combination with a plurality of special function input-output adapters, each of which are activated by said computer processor issuing predetermined selection commands over said input-output channel, comprising (a) a command decoder coupled to said computer processor input-output channel, including means for identifying at least one of said predetermined selection commands of at least a first special function input-output adapter, and for generating a first signal upon identifying said first special function input-output adapter selection command;

(b) an interrupt control circuit connected to receive said first signal, having means for interrupting said computer processor upon receipt thereof, and having means for generating a further interrupt signal, and having means for generating an enable signal;

(c) an enable circuit coupled to said first special function input-output adapter, and connected to said interrupt control circuit to receive said enable signal, said enable circuit having means for blocking said first special function input-output adapter selection command unless said enable signal is received;

(d) an auxiliary processor coupled to said computer processor and connected to receive said interrupt control circuit further interrupt; and (e) means in said computer processor for receiving said interrupt control circuit computer processor interrupt, including means for executing an interrupt processing software routine having therein a programmable selection criteria for emulating an input-output adapter and for determining whether said first special function input-output adapter is to be selected or whether an input-output adapter is to be emulated, and means for transmitting a further command to said command decoder to either unblock said first special function input-output adapter or to generate said further interrupt signal to said auxiliary processor, to cause said auxiliary processor to emulate an input-output adapter.

2. The apparatus of claim 1, further comprising a computer memory coupled to said computer processor and to said auxiliary processor.

3. The apparatus of claim 2, further comprising software means in said computer processor, responsive to receipt of said interrupt control circuit-generated computer processor interrupt, for defining the parameters of said emulated input-output adapter, and for transforming said parameters into software code in a location in computer memory accessible by said auxiliary processor.

4. The apparatus of claim 3, wherein said auxiliary processor further comprises signal means for indicating to said interrupt control circuit the termination of said auxiliary processor emulation of an input-output adapter.

5. The apparatus of claim 4, further comprising a plurality of input-output devices connected to said auxiliary processor.

6. The apparatus of claim 5, wherein said auxiliary processor emulation further comprises activation of at least one of said plurality of input-output devices.

7. A virtual channel adapter for connection to a computer processor input-output channel and for controlling cooperative interaction between said computer processor and an auxiliary processor, wherein said computer processor and said auxiliary processor each have access to the same memory, comprising (a) an address and command decoding circuit connected to said input-output channel including means for identifying input-output channel commands;

(b) an interrupt control circuit connected to said input-output channel, and to said computer processor and to said auxiliary processor, said control circuit having means for interrupting said computer processor and means for interrupting said auxiliary processor;

(c) a handshake circuit connected to said input-output channel and to said address and command decoding circuit, said handshake circuit having means for signaling to said computer processor the receipt by said address and command decoding circuit of an identified input-output channel command;

(d) means in said computer processor responsive to said means for interrupting said computer processor, including programmable selection criteria for activating said virtual channel adapter by commands to said address and command decoding circuit; and (e) means in said auxiliary processor responsive to said means for interrupting said auxiliary processor, including programmable selection criteria for deactivating said virtual channel adapter by a signal to said interrupt control circuit.

8. The apparatus of claim 7, further comprising a hardware adapter connected to said computer processor input-output channel and having means for identifying the same commands as said address and command decoding circuit, and means in said virtual channel adapter for blocking said hardware adapter command identifying means, connected to said interrupt control circuit.

9. The apparatus of claim 8, further comprising means in said computer processor for causing said interrupt control circuit to activate said means for interrupting said auxiliary processor.

10. The apparatus of claim 9, further comprising means, in said computer processor, for modifying information stored in predetermined memory locations in said same memory and for causing said auxiliary processor to access said predetermined memory locations.

11. The apparatus of claim 10, further comprising input-output devices coupled to said auxiliary processor, and means for said auxiliary processor to activate said devices as a consequence of accessing said predetermined memory locations.

* * * * *

UNITED STATES PATENT AND TRADEMARK OFFICE
CERTIFICATE OF CORRECTION

PATENT NO. : 4,707,803

DATED : November 17, 1987

INVENTOR(S) : Bruce O. Anthony, Jr., et al

It is certified that error appears in the above-identified patent and that said Letters Patent is hereby corrected as shown below:

On the title page of the patent delete the Abstract in its entirety, and substitute the following:

-- Abstract of the Disclosure

A virtual channel adapter which is connectable to an I/O channel of a computer processor and to an auxiliary processor to emulate, in cooperation with the auxiliary processor, any of a plurality of I/O devices. The virtual channel includes an I/O command and address decoder, handshake logic circuits for communication with the computer processor, interrupt control circuits for interrupting either the computer processor or the auxiliary processor, and an enable circuit connectable into another I/O hardware adapter for selective control of the activation of the other I/O hardware adapter. --

Signed and Sealed this

Seventeenth Day of May, 1988

Attest:

DONALD J. QUIGG

Attesting Officer

Commissioner of Patents and Trademarks